Aug. 6, 1968
S. L. BREMER
3,395,435
COMBINED REAMING AND FACING TOOL
Filed Dec. 28, 1967
2 Sheets-Sheet 1
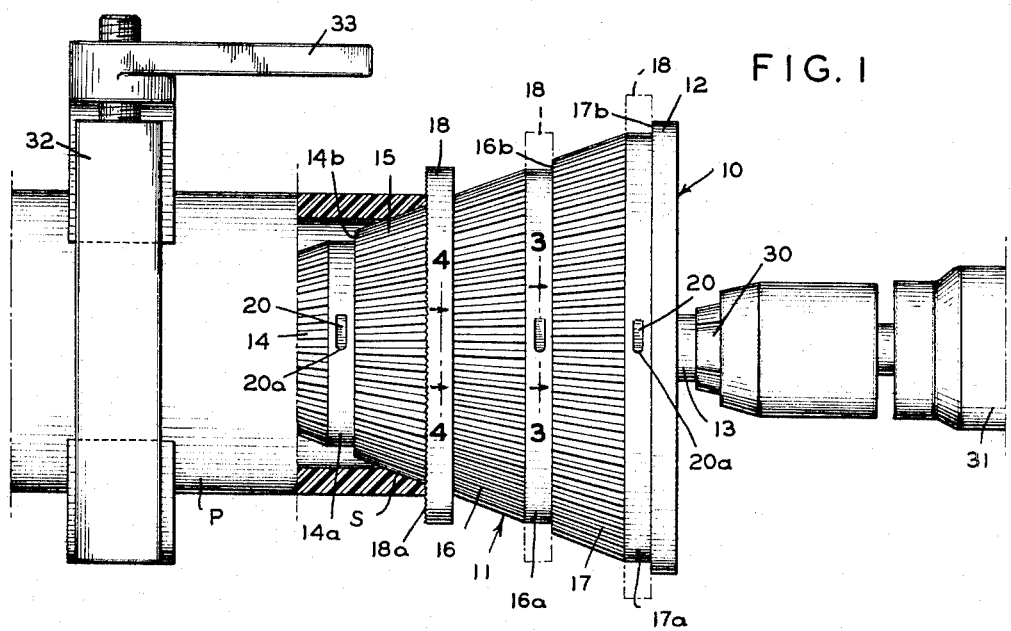
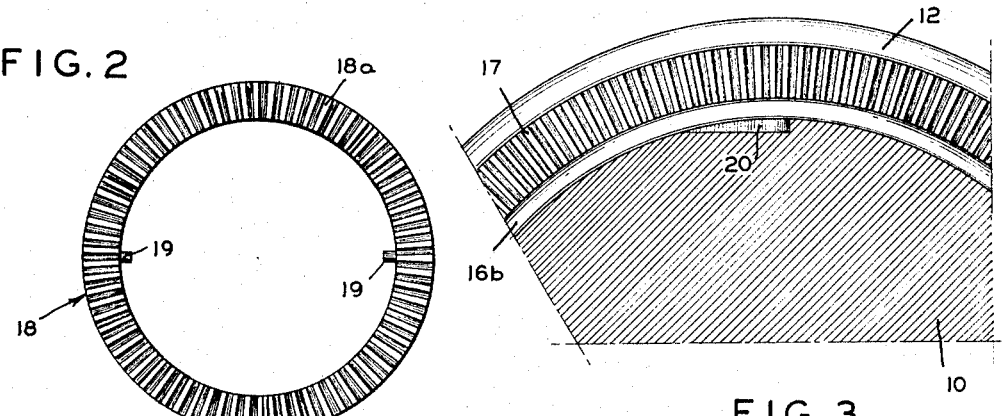
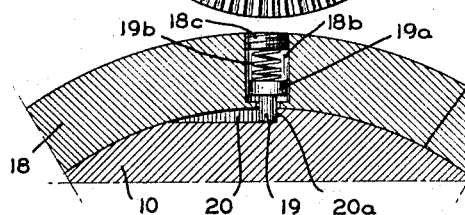
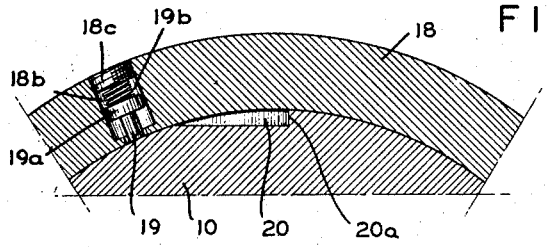
INVENTOR
SHERMAN L. BREMER
BY *Allen A. Meyer, Jr.*
ATTORNEY Aug. 6, 1968 S. L. BREMER 3,395,435
COMBINED REAMING AND FACING TOOL
Filed Dec. 28, 1967 2 Sheets-Sheet 2
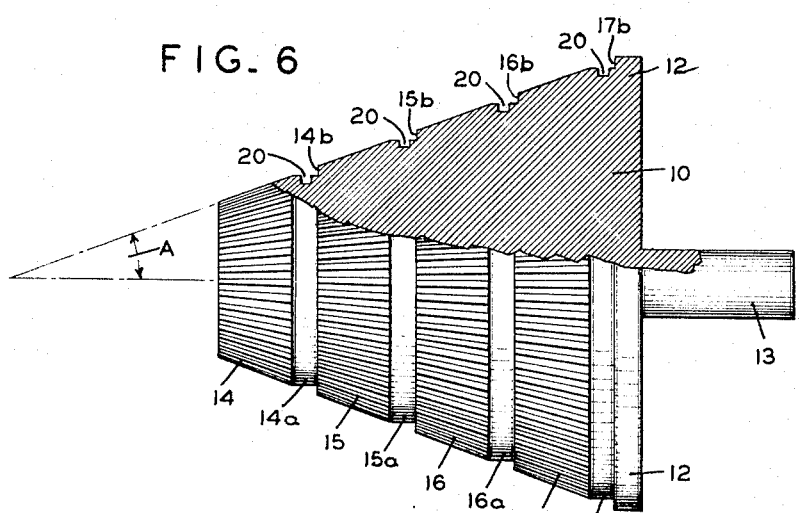
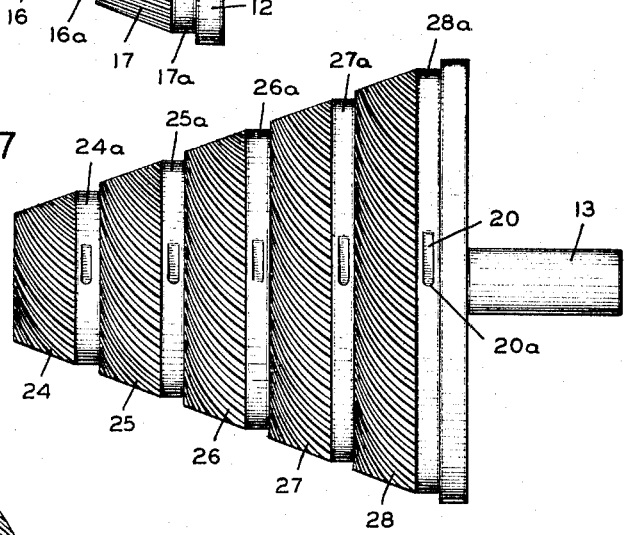
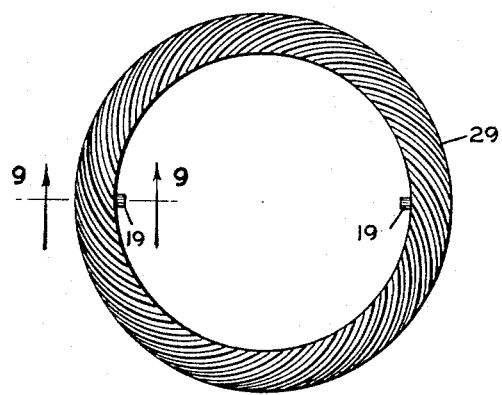
INVENTOR
SHERMAN L. BREMER
BY *Allen A. Meyer, Jr.*
ATTORNEY United States Patent Office 3,395,435
Patented Aug. 6, 1968

3,395,435
COMBINED REAMING AND FACING TOOL
Sherman L. Bremer, Champaign, Ill., assignor to National Distillers and Chemical Corporation, New York, N.Y., a corporation of Virginia
Filed Dec. 28, 1967, Ser. No. 694,291
5 Claims. (Cl. 29—103)

ABSTRACT OF THE DISCLOSURE

A combined tool for reaming the interior end surface of a plastic pipe or tube to provide a tapered wedge surface for ready attachment to a complementarily conformed plastic connector or fitting and in the same operation providing a squared and finished face or end surface on said plastic pipe or tube, the facing cutter being detachable from the reamer whereby a single tool may include a plurality of stepped reaming surfaces of increasing diameters to accommodate plastic pipes or tubes of different sizes with a detachable facing cutter for each of the graduated reaming surfaces.

---

This invention relates to the finishing of the extremities of plastic pipes and tubes, to permit the connection thereof to plastic couplings or fittings, where relatively permanent and fluid-proof joints are required.

One field of constantly increasing importance is in the plumbing industry where the use of plastic pipes is expanding to tremendous volumes. Such pipes or systems can be manufactured with great economy, consideration being given to the costs of conventional pipes, and fittings, whether produced from cast iron, brass, copper, or other metals. Plastic pipes will, in the majority of instances, outlive metallic installations. Weight factors are greatly reduced, and ease of installation, as well as labor costs in connection therewith, may be expected to revolutionize this industry.

This is particular true in the light of the fact that threaded joints or unions are no longer required and, where predetermined lengths of pipes cannot be utilized, the cutting of a plastic pipe at the site of installation presents no serious problems comparable to those inherent to the cutting, fitting and threading of metallic pipe lengths.

It is known to produce plastic couplings, unions, fittings, etc., and, to insure a fluid-tight union therewith of the plastic pipe or tube, it is required that the mating extremity of a pipe section be provided with a tapered interior wedge surface, to engage with a complementarily conformed surface in the coupling or fitting and that the pipe section be provided with a squared and finished face or end surface.

It is with a novel tool whereby such a wedge surface and squared extremity may be produced upon a pipe section with particular ease and economy that this invention is concerned.

Further objects and advantages of the present invention will be readily apparent from the following description taken in conjunction with the accompanying drawings wherein:

FIGURE 1 is a side elevational view of a combined reaming and facing tool in accordance with the present invention illustrating a plastic pipe in association therewith and with the reaming and facing operation completed;

FIGURE 2 is a front elevational view of the facing cutter constructed in accordance with the present invention and shown in FIGURE 1;

FIGURE 3 is a fragmentary detail sectional view taken on the line 3—3 of FIGURE 1;

FIGURE 4 is a fragmentary detail sectional view taken on the line 4—4 of FIGURE 1;

FIGURE 5 is a detail sectional view similar to FIGURE 4 and illustrating the facing cutter rotated to a position to permit removal thereof from the reaming tool body;

FIGURE 6 is a side elevational view, partly in section for purposes of clarity, of the reaming tool body illustrated in FIGURE 1;

FIGURE 7 is a side elevational view of a modified form of reaming tool;

FIGURE 8 is a side elevational view of a modified form of facing cutter; and

FIGURE 9 is a detail sectional view taken on the line 9—9 of FIGURE 8.

As shown in the drawings, particular reference being had to FIGURES 1 and 6 thereof, the novel reaming tool of the present invention includes a body portion 10 having a conical peripheral surface 11, an enlarged base portion 12, and a spindle or stub shaft portion 13 extending rearwardly from said base portion.

The peripheral or cutting surface of the reamer body is divided uniformly into a plurality of space cutting surfaces, four such surfaces being indicated at 14, 15, 16 and 17. It will be understood that greater or lesser number of such surfaces may be provided, these surfaces functioning selectively to produce the desired interior wedge surface in a plastic pipe of an appropriate diameter in accordance with the reamer cutting surface complementary to the interior diameter of such plastic pipe. Desirably these cutting surfaces are of identical widths and are spaced from each other by annular bearing surfaces 14a, 15a, and 16a, a similar bearing surface 17a being provided between the outer extremity of the cutting surface 17 and the adjacent base portion 12 of the reaming tool 10.

It will be noted that the bearing surfaces are of progressively increasing diameters and provide a stepped relationship between adjacent cutting surfaces and that each of these annular bearing surfaces provides a shoulder indicated at 14b, 15b, 16b, and 17b, which serves the dual function of creating the leading edge of the next adjacent reaming or cutting surface and furnishing a stop for a facing cutter to be received upon such bearing surface as will be described hereafter.

Each cutting or reaming surface is created by closely spaced cutting teeth, as known in this and related arts, and in the embodiment of the invention illustrated in FIGURES 1 and 6, these teeth are radially and longitudinally disposed, reference being had to the longitudinal axis of the reamer body.

The angular disposition of these reaming surfaces may vary through reasonable limits in accordance with the wedge angle desired. It is required, however, that where the tool includes a plurality of cutting surfaces, the angle of all of said surfaces wil be identical. This is shown with particular clarity in FIGURE 6 where the angle A is constant for the full extent of the conical reamer body 10. It has been found in practice that a wedge angle on the order of 20° is particularly suitable and creates a wedge surface S on the plastic pipe P of adequate length to insure a fluid tight joint with a complementary coupling or fitting.

Each facing cutter 18 comprises an annular element having an interior diameter complementary to that of the bearing surface upon which it is received, and the outer face of the cutter is provided with radially disposed and closely spaced cutting teeth 18a. Means is provided for locking the facing cutter 18 upon the mating bearing surface of the reamer body and in the embodiment illustrated, reference being to FIGURES 2 through 5, such means comprises a pair of diametrically spaced locking pins 19 which function as clutches and engage within diametrically located open ended slots 20 provided in the bearing surface.

Each locking pin 19 has an enlarged head portion 19a which is received within a bore 18b provided in the facing cutter. This bore includes a reduced aperture through which the stem portion of the locking pin projects and a coil spring 19b and cap screw 18c are provided to retain the locking pin in operating position under continuous spring pressure to the position illustrated in FIGURE 2.

The facing cutter may be positioned upon the reamer body with particular ease. The stem portions of the pins 19 will ride upon the cutting teeth of the reaming surface complementary to the interior diameter of the facing cutter 18 selected, in accordance with the diameter of the pipe which is to be worked upon, until the facing cutter seats upon the mating bearing surface of the reamer body in contact with the associated stop shoulder adjacent thereto.

Each of these bearing surfaces is provided with a pair of diametrically opposed open end slots 20, each of these slots terminating in a vertically disposed shoulder 20a. With the facing cutter 18 positioned upon a bearing surface, with the locking pins 19 retracted against the pressure of the springs 19b, rotation of the facing cutter in a clock-wise direction will permit the locking pins to enter into the open ends of the slots 20 and contact the stops or shoulders 20a, as illustrated in FIGURE 4 of the drawings. This will insure rotation of the facing cutter to perform its finishing function simultaneously with rotation of the reamer body.

To remove a facing cutter 18, it is only necessary that the facing cutter be turned counter clock-wise to the position shown in FIGURE 5, with the locking pins 19 no longer within the confines of the slots 20, and lateral movement along the longitudinal axis of the reamer body permits ready separation and removal of the facing cutter from the reamer body.

While it is contemplated that the combined reaming and facing tool of the present invention may be operated manually through the use of an appropriate handle (not shown) associated with the stub shaft or spindle 13, power driven mechanism for operation thereof has been illustrated in FIGURE 1 of the drawings.

As shown, the spindle 13 is received within the conventional chuck 30, or the like, of an electric drill or lathe illustrated diagrammatically at 31. An aligned work piece holder 32 (also illustrated diagrammatically) is provided and the plastic pipe or tube P is securely clamped therein by the adjustable lever 33.

Selection of a facing cutter 18 in accordance with the interior diameter of the pipe P and the complementary reaming surface, and the positioning thereof upon the reamer body, is particularly simple and advancement of the reamer body, simultaneously with the rotation thereby, will provide the required wedge angle and facing surface with particular ease and economy as well as continued uniformity through each successive operation of the tool.

The teeth of the reaming and facing surfaces described hereabove have been illustrated as radially and longitudinally disposed and such machined surfaces may be produced with particular economy. It is contemplated, however, that other forms of cutting teeth or surfaces may be employed and a desirable variety thereof has been illustrated in FIGURES 7, 8 and 9 of the drawings.

As shown, particular reference being had to FIGURE 7, the modified form of reaming tool includes spaced reaming surfaces 24, 25, 26, 27 and 28, each of which has spiral facing teeth. Bearing surfaces are provided between adjacent reaming surfaces and each of these has diametrically disposed open end slots 20 to receive the spring-pressed locking pins 19 of the facing cutter, all as described hereabove.

The facing cutter 29, shown in FIGURES 8 and 9, also has spiral facing teeth and the particular advantage to be derived through the use of this cutting tooth formation is the self-cleaning characteristics thereof. Locking pin structure may be identical as described previously and no further discussion thereof is thought to be required.

It will be obvious to those skilled in this art that various charges may be made in the invention without departing from the spirit and scope thereof and the invention is not considered limited by that which is shown in the drawings and described in the specification. Reference therefore is had to the claims for summaries of the essentials of the invention, and of the novel features of construction and novel combinations of parts, for all of which protection is desired.

What is claimed is:

1. A combined reaming and facing tool comprising a reamer body having a conical toothed reaming surface merging into an annular bearing surface having a diameter substantially identical to the maximum diameter of said conical reaming surface, an annular facing cutter detachably mounted upon said bearing surface, the forward face of said cutter having a toothed cutting surface in alignment with the inner extremity of said conical reaming surface, means for engaging said facing cutter with said bearing surface to insure simultaneous rotation of said facing cutter with said reamer body, said means comprising opposed spring-pressed locking pins mounted in bores in said facing cutter and engageable within complementarily located open end slots provided in said bearing surface, each of said slots terminating in a vertical shoulder engaged by the associated locking pin, and means on said body for limiting rearward movement of the facing cutter upon the annular bearing surface.

2. A combined reaming and facing tool for reaming the interior end surface of a plastic pipe to provide a tapered wedge angle and simultaneously square and finish the adjacent face of said plastic pipe; said tool comprising a reamer body having a conical outer surface divided uniformly to provide a plurality of stepped and spaced toothed reaming surfaces of progressively increasing diameters lying in a common plane with respect to the longitudinal axis of said reamer body; each of said reaming surfaces merging into an annular bearing surface having a diameter substantially identical to the maximum diameter of the merging reaming surface; a plurality of annular facing cutters of progressively increasing diameters, one for each annular bearing surface, the forward faces of said facing cutters being provided with toothed cutting surfaces; means for selectively engaging a facing cutter with the mating annular bearing surface to insure simultaneous rotation of said facing cutter with said reamer body; means on said reamer body for limiting rearward movement of a facing cutter upon its associated annular bearing surface; and spindle means on the rear face of said body for attachment to drive means.

3. A combined reaming and facing tool as set forth in claim 2 where said means for engaging a facing cutter with an annular bearing surface comprises opposed spring-pressed locking pins mounted in bores in said facing cutter, said pins being received within complementarily located open end slots provided in each annular bearing surface, each of said slots terminating in a vertical shoulder engaged by the associated locking pin to limit rotative movement in one direction as between the facing cutter and the mating annular bearing surface.

4. A combined reaming and facing tool as set forth in claim 3 where the cutting teeth on the reaming surfaces and facing cutters are disposed radially.

5. A combined reaming and facing tool as set forth in claim 3 where the cutting teeth on the reaming surfaces and facing cutters are disposed spirally.

References Cited

UNITED STATES PATENTS

| | | | |
|---|---|---|---|
| 356,957 | 2/1887 | Delgado | 77—73 |
| 2,583,246 | 1/1952 | Williams | 77—73 |
| 2,875,651 | 3/1959 | Kissinger | 77—73 |
| 3,018,675 | 1/1962 | Klages | 77—58 |
| 3,266,345 | 8/1966 | Weisner | 77—73 |

FOREIGN PATENTS

| | | |
|---|---|---|
| 995,043 | 6/1965 | Great Britain. |
| 878,959 | 11/1942 | France. |

HARRISON L. HINSON, *Primary Examiner.*